(12) United States Patent
Claeys

(10) Patent No.: US 12,189,359 B2
(45) Date of Patent: Jan. 7, 2025

(54) METHOD FOR SIMULTANEOUS DATA VISUALIZATION OF DATA STEMMING FROM CONTROLLING AND/OR MONITORING AN INDUSTRIAL PRODUCTION PROCESS

(71) Applicant: SIEMENS AKTIENGESELLSCHAFT, Munich (DE)

(72) Inventor: Luc Claeys, Zingem (BE)

(73) Assignee: Siemens Aktiengesellschaft, Munich (DE)

( * ) Notice: Subject to any disclaimer, the term of this patent is extended or adjusted under 35 U.S.C. 154(b) by 1070 days.

(21) Appl. No.: 15/262,046

(22) Filed: Sep. 12, 2016

(65) Prior Publication Data

US 2017/0075340 A1 Mar. 16, 2017

(30) Foreign Application Priority Data

Sep. 11, 2015 (EP) .................................... 15184908

(51) Int. Cl.
*G05B 19/4063* (2006.01)
*G05B 11/01* (2006.01)
*G06Q 10/06* (2023.01)
*G06T 11/20* (2006.01)

(52) U.S. Cl.
CPC .......... *G05B 19/4063* (2013.01); *G05B 11/01* (2013.01); *G06Q 10/06* (2013.01); *G06T 11/206* (2013.01); *G05B 2219/40161* (2013.01)

(58) Field of Classification Search
None
See application file for complete search history.

(56) References Cited

U.S. PATENT DOCUMENTS

| | | | |
|---|---|---|---|
| 2002/0010571 A1* | 1/2002 | Daniel, Jr. | ......... G05B 23/0216 703/21 |
| 2013/0311910 A1* | 11/2013 | Stambaugh | ............. G06F 16/26 715/760 |
| 2014/0075004 A1* | 3/2014 | Van Dusen | ....... G06F 16/90335 709/223 |

FOREIGN PATENT DOCUMENTS

| | | |
|---|---|---|
| CN | 101872161 A | 10/2010 |
| CN | 102877443 A | 1/2013 |
| CN | 104808634 A | 7/2015 |
| KR | 2003012681 A | 2/2003 |

* cited by examiner

*Primary Examiner* — Mohammad Ali
*Assistant Examiner* — Saad M Kabir
(74) *Attorney, Agent, or Firm* — Laurence A. Greenberg; Werner H. Stemer; Ralph E. Locher

(57) ABSTRACT

A method for the visualization of one or more dimensions of data. The data originate from controlling and/or monitoring an industrial production process, which is controlled by a manufacturing execution system. The visualization creates a virtual reality landscape by mapping the data onto symbols. The symbols are contained in a symbol library and they are selected in dependency of the value for the data.

8 Claims, 6 Drawing Sheets

METHOD FOR SIMULTANEOUS DATA VISUALIZATION OF DATA STEMMING FROM CONTROLLING AND/OR MONITORING AN INDUSTRIAL PRODUCTION PROCESS

CROSS-REFERENCE TO RELATED APPLICATION

This application claims the priority, under 35 U.S.C. § 119, of European patent application EP 15184908, filed Sep. 11, 2015; the prior application is herewith incorporated by reference in its entirety.

BACKGROUND OF THE INVENTION

Field of the Invention

The present invention relates to the field of data visualization of data stemming from controlling and/or monitoring an industrial production process within the environment of a manufacturing execution system (MES).

In the world of industrial automation of today, in order to increase competitiveness, manufacturing companies need to simultaneously reduce time-to-market, increase process visibility and production flexibility, optimize forecasting and scheduling, and reduce scrap, stock levels and downtimes; all while ensuring optimal quality and production efficiency across all global facilities.

Hence in order to meet these demanding goals, manufacturing companies require an integrated IT infrastructure that helps them in coordinating production on a global scale and, if necessary, in real time. A Manufacturing Execution System (MES) controls and/or monitors an industrial production process and is generally known as the IT layer that integrates the business systems, e.g. enterprise resource planning (ERP), and production control systems.

In order to control and/or monitor the production process or process, there is continuous requirement of knowledge for the user of the data of the industrial production process. This is best achieved by means of data visualization within the MES.

Siemens Corporation offers a broad range of MES products, under its SIMATIC® IT product family.

As defined by the Manufacturing Enterprise Solutions Association (MESA International), the MES system "is a dynamic information system that drives effective execution of manufacturing operations," by managing "production operations from point of order release into manufacturing to point of product delivery into finished goods" and by providing "mission critical information about production activities to others across the organization and supply chain via bi-directional communication." The international standard for developing MES systems is commonly referred to as ISA-95 or S95.

The functions that a MES system usually includes are resource allocation and status, dispatching production orders, data collection/acquisition, quality management, maintenance management, performance analysis, operations/detail scheduling, document control, labor management, process management and product tracking.

Thus, the goal of MES systems developed by software suppliers is to provide manufacturing companies (the customers) with tools for measuring and controlling production activities with the aim of boosting profitability, increasing productivity, improving quality and process performance to manufacturing plants. In order to enable a user, typically a plant operator or line responsible personnel, to perform some useful actions within a MES system at runtime, e.g. monitoring values coming from plant process or controlling a plant device, a comprehensible and intuitive data visualization is required.

MES systems are provided with front-end/client GUI applications which may be used by the user to plan and control manufacturing activities of the production process. Adequate visualization of the production process within the MES GUI application plays a key role in bringing together process, quality and business information from various sources into one unified real-time view of the production status of the plant. In fact, MES GUI applications display to the user graphical screens (MES screens) which enable overview of several parameters or scenarios of the plant activities.

Today, the data of an industrial production process are most often visualized by means of two-dimensional graphs or charts such as line charts, bar charts, pie charts and scatter charts that only show a combination of two, sometimes three dimensions of the data. At times multiple charts are superposed in order to reveal correlation, or are combined next to each other into dashboards in an attempt to show the whole picture in one shot. More complex types of charts, such as two-dimensional and three-dimensional bubble charts, stream graphs and network charts, combine up to six or seven dimensions of data in one chart, but are often conceived as too complex.

Another visualization technique uses a metaphor as a back-ground to which the data is merely linked. In this way, a catchy realistic virtualization of a production plant, to which classic key production index (KPI) charts are linked, is achieved.

A surface plot visualization of data is common, but only a pure mathematical three-dimensional representation of the data.

The mixture of too many abstract representations in the mentioned common data visualization techniques is visually overwhelming the user's mind, especially when data from multiple dimensions are visualized simultaneously. This makes it hard for a user to quickly and adequately react on changes of the KPI values. The user however often has limited time available to make a decision.

SUMMARY OF THE INVENTION

It is accordingly an object of the invention to provide a method and system which overcomes the above-mentioned and other disadvantages of the heretofore-known devices and methods of this general type and which provides for a method for the visualization of one or more dimensions of data of an industrial production process in a comprehensible and intuitive way that is not overwhelming the user's mind to allow adequate controlling and/or monitoring of said industrial production process.

With the foregoing and other objects in view there is provided, in accordance with the invention, a method of visualizing one or more dimensions of data in a manufacturing execution system (MES), the method comprising:

acquiring data from controlling and/or monitoring an industrial production process that is controlled by the manufacturing execution system (MES);

creating a virtual reality landscape by mapping the data onto symbols, the symbols being comprised in a symbol library, each symbol having a range for a value of the data or a specific data value assigned thereto;

selecting the symbols in dependence on the value for the data; and displaying the virtual reality landscape to a user for enabling the user to control and/or monitor the industrial production process.

This objective is achieved according to the invention by a method for a visualization of one or more dimensions of data, the data stemming from controlling and/or monitoring an industrial production process, controlled within the environment of a manufacturing execution system (MES), the visualization creates a virtual reality landscape by mapping of said data onto symbols, said symbols being comprised in a symbol library wherein for each symbol a range for the value of the data or a specific data value is assigned. The symbols are selected in dependence on the value for the data.

Metaphors share the same properties of the literal meaning they represent and are therefore intuitive. Idioms do not share the same properties of the literal meaning they are referring to and therefore require of the user to consciously learn their meaning first. For making the information of the data more accessible by allowing the user to interpret, interact with and manipulate said data using his natural knowledge of things, the symbols may be metaphors and/or idioms each representing one or more dimensions of the data in a preferred embodiment of the invention. This may also reduce the need for deep technical knowledge and allows the user to interpret the information at a higher abstract value.

In an advantageous embodiment of the invention, the one or more dimensions of data can be visualized simultaneously. In this way, even more information content can be presented at once.

In order to make further use of the user's natural knowledge of things in a preferred embodiment of the invention, the symbols can be selected from a group comprising real world objects, natural phenomena, natural conditions and acoustic phenomena.

In one embodiment of the invention, the virtual reality landscape itself can be a symbol for the visualized data. This opens a very rich capability for visualizing multiple dimensions, without overwhelming the user's human brain.

To allow combination with traditional ways of data visualization in a particular embodiment of the invention, one or more objects can be placed into the virtual reality landscape.

In order to visualize separate data segments simultaneously in a preferred embodiment of the invention, one or more individual virtual reality landscapes can be combined.

In an advantageous embodiment of the invention that always allows an accurate mapping of the data onto the virtual reality landscape, the visualization can be dynamic.

To create a virtual reality landscape in another embodiment of the invention that is adapted such that it makes most use of an individual user's natural knowledge of things, a mapping of data and symbols can be changeable with a user interface.

Preferred embodiments of the present invention are described hereinafter in more detail with reference to the following drawings.

Other features which are considered as characteristic for the invention are set forth in the appended claims.

Although the invention is illustrated and described herein as embodied in a method for simultaneous data visualization of data stemming from controlling and/or monitoring an industrial production process, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
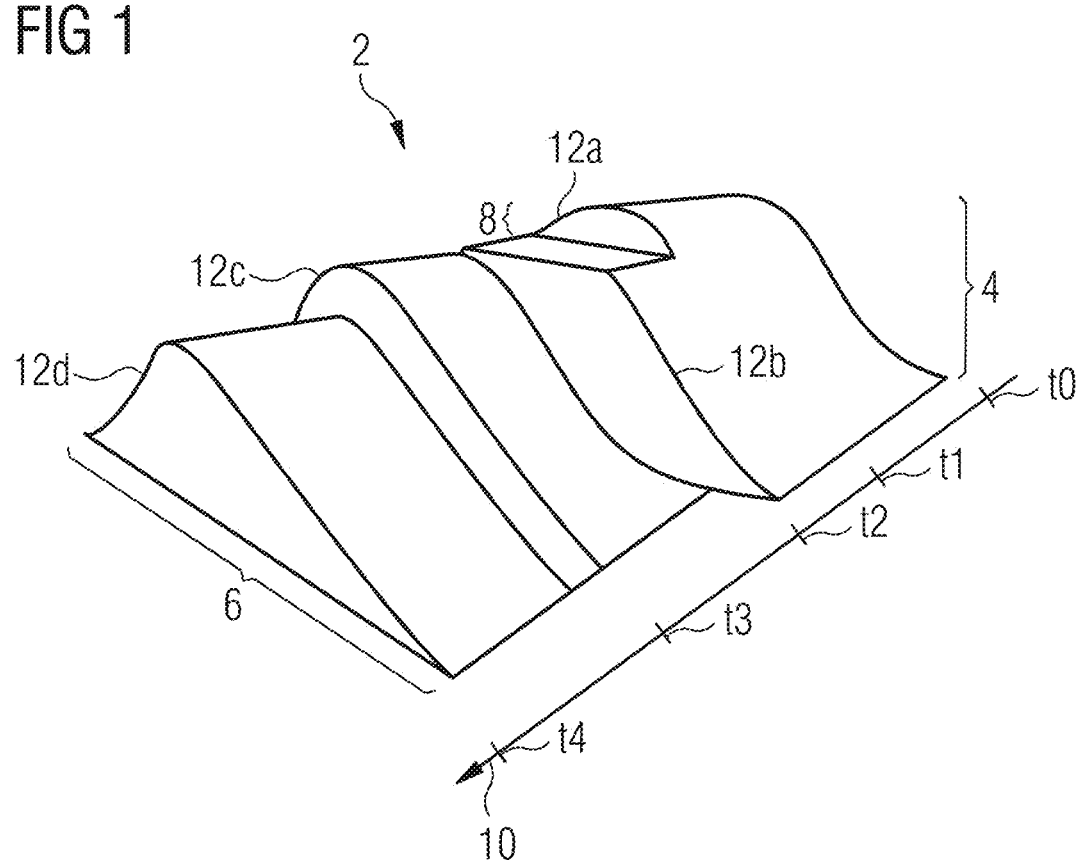
FIG. 1 schematically a mountain ridge metaphor visualizing KPI's for a production line in a factory.

Referring now to the figures of the drawing in detail and first, particularly, to FIG. 1 thereof, there is shown schematically in a three-dimensional way a virtual reality landscape of a mountain ridge 2 metaphor showing several dimensions of data stemming from KPI's (key performance indicators) of an industrial production process in a production line of a factory according to a preferred embodiment of the invention. The production line is controlled by a manufacturing execution (MES) system. The KPI's are obtained by monitoring said industrial production process and can also be used as input signal for controlling the industrial production process. Reporting processes, business intelligence and processes in the field of computer programs and systems that are traditionally visualized with dashboards can as well be visualized in the form of in a virtual reality landscape.

The data are directly mapped onto symbols in the form of terrain shape metaphors that create the virtual reality landscape of the mountain ridge 2. This means that the visualization includes a process of translation and mapping from the value of the data to the respective symbol. The data are converted according to a symbol model which can be adapted by the user. Symbols are real-world things comprised in a symbol library and selected in dependency of the value for the data. They are chosen such that they are symbolic of some data dimension or measure they represent and can therefore significantly simplify the transfer of information from a data source to the human mind. This is because the symbols allow a quick convey of meanings based on a user's natural knowledge of things. In this way, communication takes place on a more abstract level where expert knowledge isn't required to understand the visualization.

The symbols are metaphors and/or idioms each representing one or more dimensions of the data. When the mapping between a symbol and data is direct, intuitive and natural, the symbol is a metaphor; and when it is not, the symbol is an idiom. Metaphors and data share the same properties; the mapping of data onto idioms only gets established by consistent usage. There is a large gray zone between metaphors and idioms, where for one user the mapping will be intuitive, and for another user it won't.

For most users, the symbol of the mountain ridge 2 belongs to the group of metaphors. The height 4 of the mountain ridge 2 visualizes the production quantity, its base width 6 visualizes the line capacity, the length axis 10 of the mountain ridge 2 visualizes time and the flattening 8 of the mountain ridge 2 top visualizes the scrap quantity. At time t1, a suddenly appearing first steep face 12*a* of the mountain ridge 2 and the plateau between times t1 and t2 indicates a step in the production process that quickly leads to a significant amount of scrap quantity. A second steep face 12*b* at time t2 indicates a sudden decrease of the line capacity. And a third steep face 12*c* at time t3 shows a suddenly decreasing production quantity.

Overall, four dimensions of data are shown and visualized simultaneously in the single virtual reality landscape of FIG. 1 in a way that is quickly graspable by the human mind. The symbols height 4, base width 6 and flattening 8 are intuitive and thus rather metaphors, because they directly map a quantity unit to a length unit, something that the user is accustomed to from traditional ways of data representation. A consistent equal length unit for one unit of the same data type such as scrap quantity, production quantity and line capacity is intuitive and may therefore be preferential in certain cases, for example when all unit quantities are of comparable magnitude, but not mandatory. The metaphor time is rather intuitive as well. In order to cover a distance along the ridge, a hiker requires a certain amount of time that can directly be converted to a length unit, assuming that the hiker proceeds at constant speed.

Figure 2:
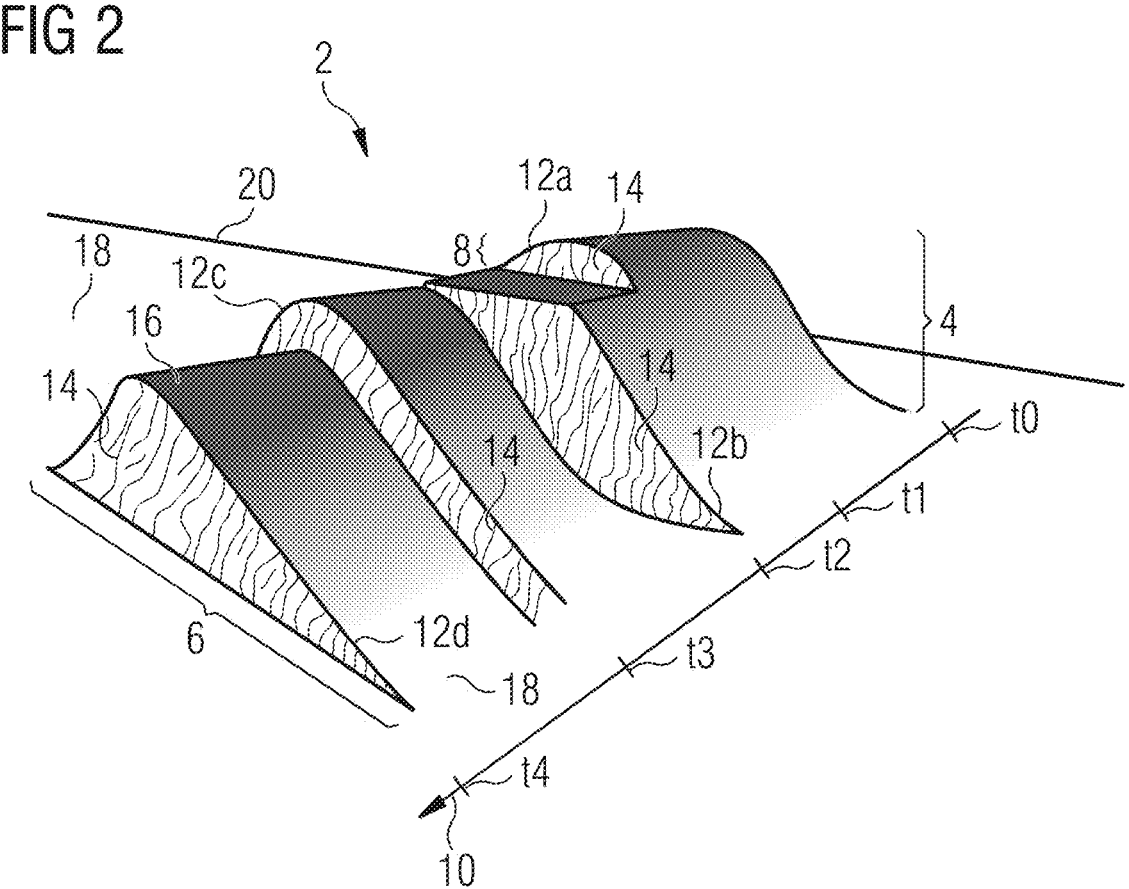
FIG. 2 the mountain ridge metaphor of FIG. 1 with additional surface visualization aspects.

FIG. 2 shows the mountain ridge 2 metaphor of FIG. 1, embellished with terrain texture surface visualization aspects. Rocks 14 are shown on steep faces 12*a-d* with stronger appearance in steep areas. Grass 16, shown as dark shading or in colored drawings in green, is thicker at higher levels of the mountain ridge 2. Sand 18, indicated by absence of dark shading or in colored drawings in yellow, is most present at lower levels of the mountain ridge 2 and in the plane. A horizon 20 is added in the background. These and most other surface visualization aspects are linked to the shape of the landscape and give it a more natural look. The surface visualization aspects of FIG. 2 do not function as a metaphor on their own, but they help the landscape metaphors to become even more obviously visible and thus even easier and quicker to grasp for the human mind, which is especially obvious when comparing FIGS. 1 and 2. In principle, surface visualization aspects can also be used as real symbols by mapping them to additional data dimensions.

Figure 3:
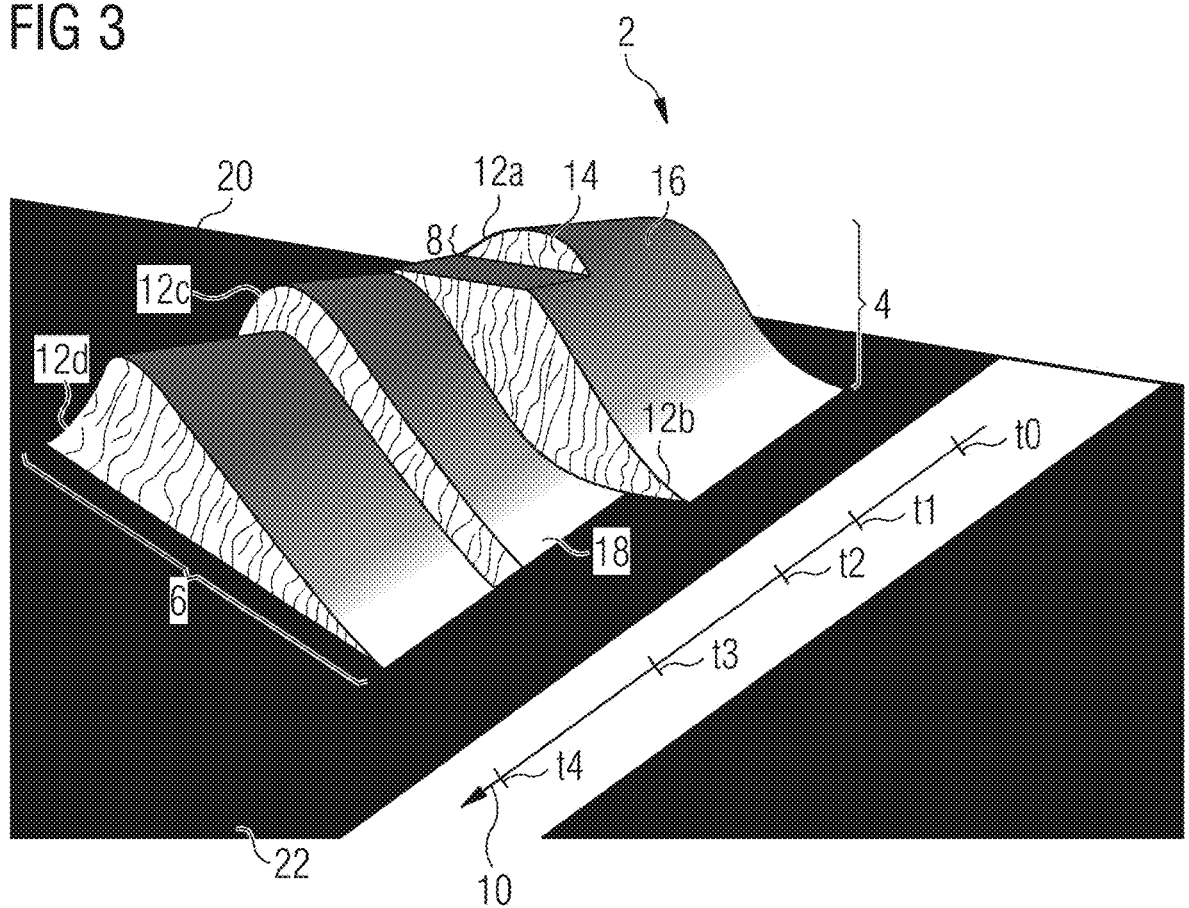
FIG. 3 the mountain ridge metaphor as shown in FIG. 2 with an added inverse metaphor.

FIG. 3 shows the mountain ridge 2 metaphor as shown in FIG. 2 with a river 22 at the base of the mountain ridge 2. When the capacity of the production line is not completely used, the river 22 spreads over the lower area of the mountain ridge 2. The inverse of the line capacity is hence mapped onto and visualized as the width of the inundation of the river 22 and its amount of water. As such, the amount of water accentuates the unused capacity of the production line and functions as an inverse metaphor.

Figure 4:
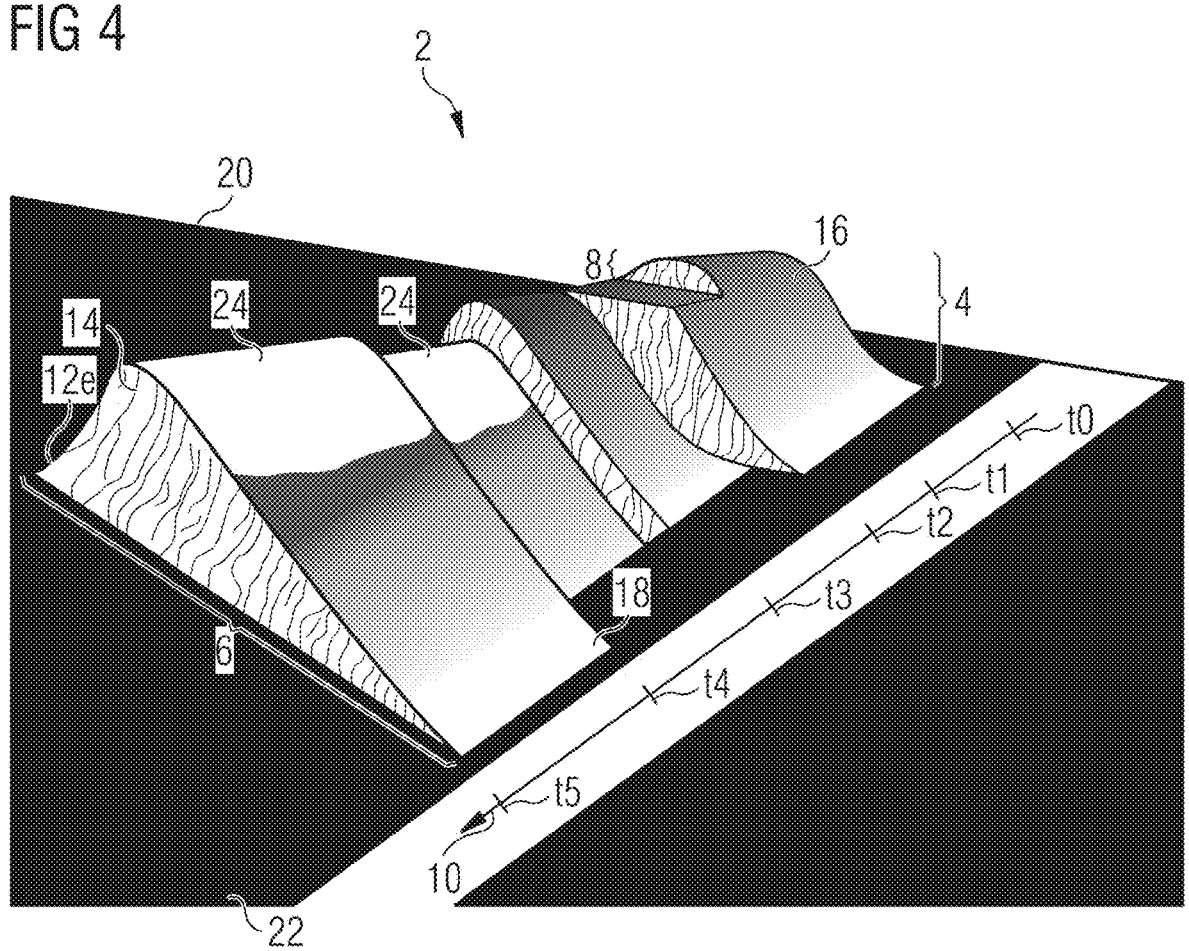
FIG. 4 the mountain ridge metaphor as shown in FIG. 3 but over a longer time period with an additional surface visualization aspect.

FIG. 4 shows the mountain ridge 2 metaphor as already shown in FIG. 3 but over a longer time period. At time t4, the line capacity as well as the production quantity increase suddenly which is visualized by the increased base width 6 and the height 4 of the mountain ridge 2. Parts of the mountain ridge 2 surface are covered with snow 24. The amount of snow 24 serves as yet an additional terrain surface visualization aspect and corresponds to the amount of production backlog at its location. When shown in color, the contrast between green grass 16 and white snow 24 conveys the production backlog information in an even more obvious way.

Similar surface terrain metaphors mapped onto additional data dimensions can be added in additional variants of the mountain ridge 2 metaphor. All surface terrain metaphors have to be blended in an appropriate way.

Figure 5:
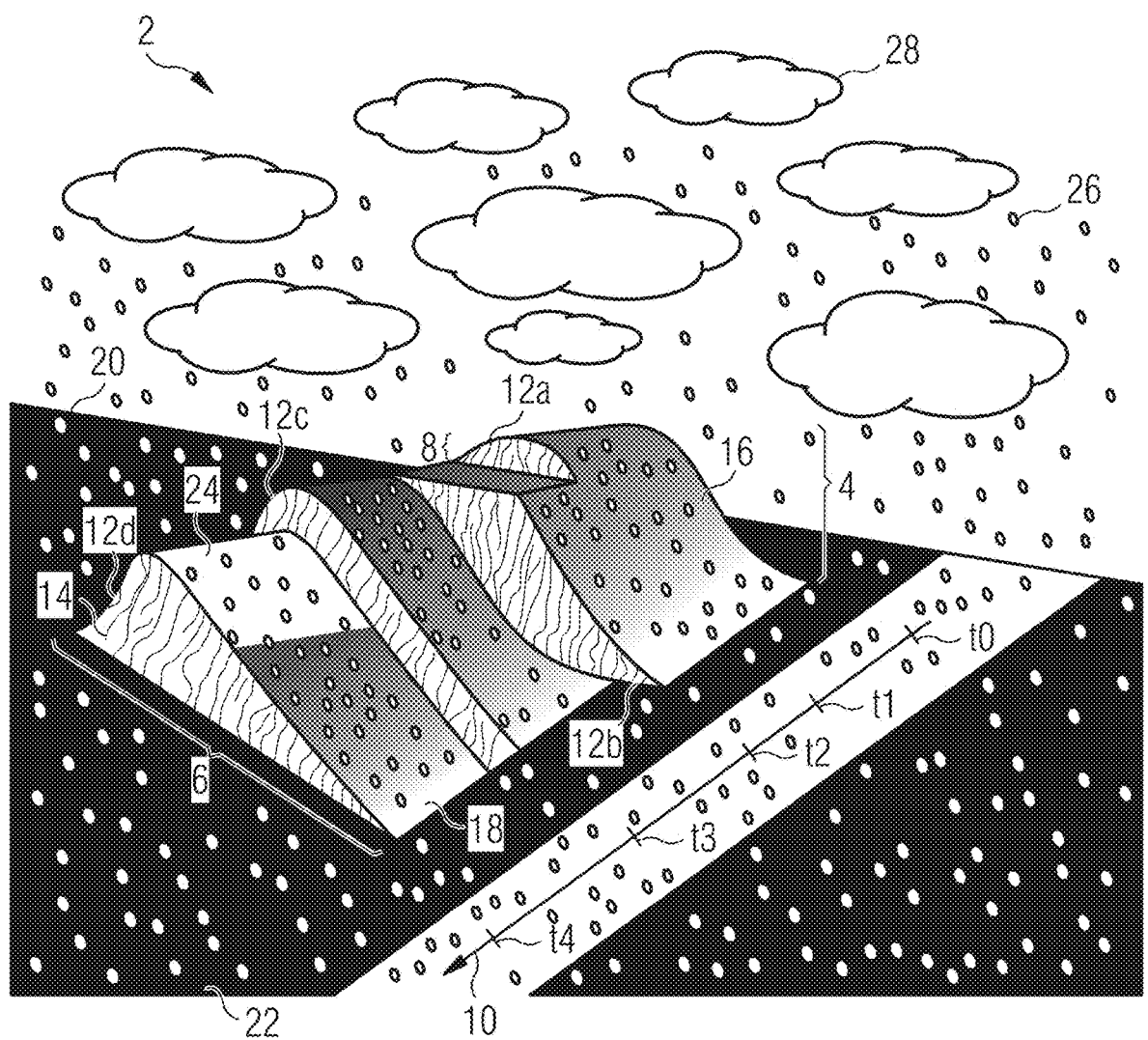
FIG. 5 schematically a mountain ridge metaphor as already shown in FIG. 4 but over the time period of FIGS. 1 to 3 indicating a growing production backlog.

FIG. 5 shows schematically the mountain ridge 2 metaphor as already shown in FIG. 4 but over the time period of FIGS. 1 to 3 with an added weather condition metaphor of snowfall 26 indicating a growing production backlog. The amount of snow 24 on the mountain ridge 2 surface only indicates the presence and amount of a production backlog, but not whether it is increasing or decreasing. The trend of production backlog is mapped to different weather conditions. A fast increase is visualized as snowfall 26 that gets heavier with a growing increase, a production backlog growing at medium speed is indicated by rainfall, a slowly increasing or even decreasing production backlog by the absence of snowfall 26. The global KPI of the production line is indicated by sky gradations between sunny and cloudy. The global KPI of FIG. 5 has room for improvement, which is conveyed by several extended clouds 28. Weather condition metaphors are especially well suited for giving a first feedback to the user, but not for conveying exact quantities.

Figure 6:
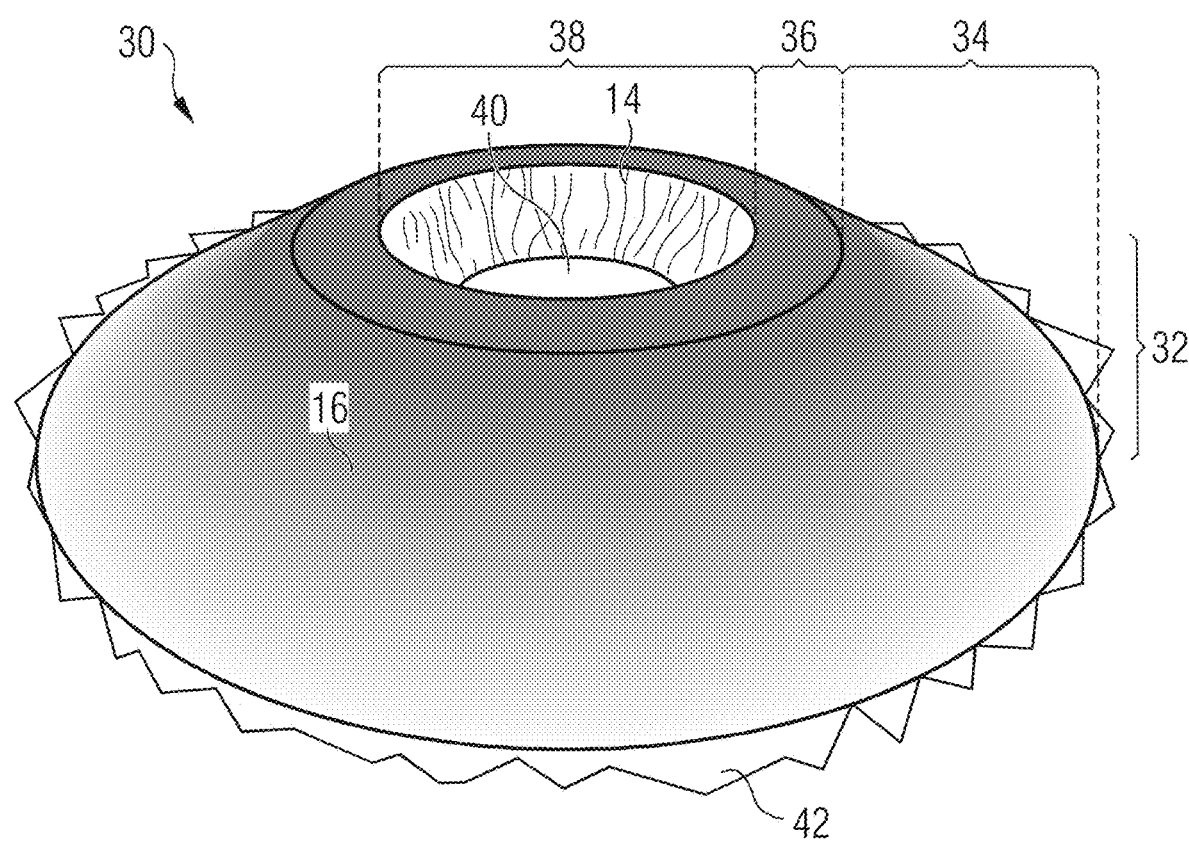
FIG. 6 schematically a volcano metaphor.

FIG. 6 shows schematically a volcano 30 metaphor in a preferred embodiment of the invention. The volcano 30 metaphor is especially suitable to visualize a number of KPTs from a quality control laboratory linked to a production line in a factory. The number of analyses to be executed are shown as the height 32 of the volcano 30 which can be converted to the length 34 of its hillslope, assuming that the slope is known. The width 36 of the volcano 30 border visualizes the number of analysis to be validated and the width 38 of the volcano 30 crater the number of validated analysis. These metaphors belong to the category of terrain shape metaphors.

Terrain surface are and weather condition metaphors can be added with semantics that are compatible to the mountain ridge 2 metaphor of FIGS. 1 to 5. For instance, the volcano 30 is partly covered with grass 16 with stronger appearance at higher levels of the volcano 30 to quickly grasp the terrain shape metaphor. The volcano 30 could also partly be covered with snow 24, with the amount of snow 24 being based on the current analysis and/validation backlog of the production line.

An accepted/rejected ratio can be accentuated as a crater lake 40 and/or at the bottom of the hillside as a blending 42 of water and lava. The size of the crater lake 40 and of the blending 42 of water and lava shows the combined amount of accepted and rejected validations. Water visualizes the amount of accepted validations in blue color, lava visualizes the amount of rejected validations in red color. Said accepted/rejected ratio can be accentuated further by using smoke in the form of an eruption column coming out of the volcano 30. The eruption column appears only below a certain threshold of the accepted/rejected ratio and becomes more amplified the lower the ratio becomes. If the ratio becomes too low, an eruption sound appears as an acoustic warning to alert the user.

The symbols metaphors and idioms onto which the data are mapped comprise real world objects. The real world objects are landscape metaphors like the mountain ridge 2, the river 22 and the volcano 30. Not only the three dimensions of the terrain, but also additional features such as terrain texture and vegetation that may be shown in color serve as symbols onto which additional data dimensions are mapped or as accentuations for the shown terrain features. Natural phenomena and conditions comprising sunny, cloudy, foggy, windy, rainy and/or snowy weather conditions and volcanic eruptions and acoustic phenomena such as the eruption sound or a thunder as warning signals are also used as symbols. With all of these symbols, the user can experience, almost feel the data.

Unlike the mountain ridge 2 metaphor of FIGS. 1 to 5 that show the KPIs of a production line over a longer time period, the volcano 30 metaphor of FIG. 6 is static and visualizes only the current KPI values from the above mentioned quality control laboratory. The visualization becomes dynamic by refreshing it based on the new up-to-date underlying dataset. Refreshing occurs on an appropriate time basis, e.g. every day when on-line knowledge is not required, every hour or even every minute resulting in an almost real-time visualization when instantaneous knowledge of the KPI values is required. The refreshing of the visualization can also be user triggered. In this way, the volcano 30 metaphor can be used to visualize the progress of the analysis executed.

The landscapes forming a three-dimensional virtual terrain shown in FIGS. 1 to 6 are not used as a background onto which the data are positioned in a structured logical way, but each virtual reality landscape itself is a symbol for and represents the data. The landscape itself doesn't have to match the real environment the data is related to and has no close connection to the nature of the data. There is for instance no obvious relation between a production plant and a mountain ridge 2 and/or a volcano 30.

In addition to the mapping of data onto symbols as virtual physical metaphors, there is still plenty of room to put one or more objects of different types into the virtual reality landscape, to indicate specific alerts and/or important additional details about the mapped data. The objects can be symbols onto which data are mapped, but also gateways to drill down in the underlying data. The objects may popup traditional ways of data representation such as charts and graphs, but also textual panels that display details about the current location or object in focus. In this way, the virtual reality visualization is combined with traditional ways of data visualization.

Objects such as rocks 14 can be used as terrain texture metaphors as in FIGS. 2 to 6, but can also be symbols corresponding to production scrap that are added and spread over the horizontal plateau of the mountain ridge 2 of FIGS. 1 to 5. As an alternative symbol, one could also put a scrap-container on the corresponding location of the mountain ridge 2, e.g. the plateau. The eruption column of the volcano 30 metaphor is a metaphor object. There are other metaphor objects that provide additional alert and information messages along with the data, e.g. a fire for alerts of type defect, a bulldozer for alerts of type maintenance, a pile or a bag for alerts concerning raw materials and a cardboard box for alerts concerning a packaging segment of the production line. The latter is an example of an object metaphor corresponding to different segments in the production line.

In an advantageous embodiment of the invention, a textual panel appears at time t2 in the mountain ridge 2 metaphor as shown in FIGS. 1 to 5 with the text "reduced capacity due to maintenance," explaining the sudden decrease of line capacity. The panel is either permanently visible in the landscape, or can be put dynamically, such that it is only shown when the panel is in focus of the user with a viewfinder.

It is useful to trigger specific actions on an object when it is in focus with the viewfinder. Additional extra information about a data location or object such as alert messages and values of the different data dimensions at the location can be shown. Furthermore, external applications such as opening a classic report that drills down on the underlying data can be triggered.

To improve the natural look of a virtual reality landscape and make it thus more intuitive in a preferred embodiment of the invention, a small random surface height deviation is added in order to avoid artificial flat surfaces. The amount of random deviation has to be small enough in order not to disturb the interpretation of the real terrain shape metaphor.

In one embodiment of the invention, one or more individual reality landscapes each representing a data segment are combined and create a virtual reality world. A combination of the virtual reality landscapes of the mountain ridge 2 of FIG. 5 and the volcano 30 of FIG. 6 simultaneously shows the KPI values of a production line over a time period with the help of the mountain ridge 2 and the KPI values from the quality control laboratory at a time ti within said time period with the help of the volcano 30. In general, a virtual reality world visualizes multiple segments of data originating from multiple production lines, multiple divisions or departments and/or multiple types of services. Each data segment consists of one or more dimensions as described above and is mapped onto one virtual reality landscape.

The virtual reality landscapes may or may not consist of the same metaphor model and can be laid out next to each other, or around a central point. The latter has the ad-vantage of providing a good first overview and central starting point for the user, with a panoramic view on all data segments. A more specific view on the data segments is enabled from said central point by simply turning around a user's camera.

To further navigate within and explore the virtual reality landscape, the virtual reality landscape is changed with a user interface. The user interface uses standard video gaming navigation techniques. The user can choose to navi-gate on the surface or go in fly-mode. The camera position can be centric or dynamic.

The user can interactively change the window on the underlying dataset in order to reshape the virtual reality landscape with a user interface. The user may furthermore change the mapping of data and symbols, the visualized window of the underlying dataset. An example for this is an interactive change of the time dimension of the mountain ridge 2 metaphor which is visible as a scrolling mountain ridge 2.

Especially when multiple virtual reality landscapes are combined, a mini-map displayed in addition to the visualization, for instance in the corner of the screen can help the user not to get lost. A viewfinder displayed in the middle of the visualization, comparable to a gunsight in video games or the finder in a video camera, may include visual indicators when there is more detailed information available on the location or object in focus. When a point of interest is in the viewfinder, the user is able to zoom in and out on it. This may be more efficient compared to navigating closer to the location in focus.

The following is a summary list of reference numerals and the corresponding structure used in the above description of the invention:

2 mountain ridge
4 height of the mountain ridge
6 base width of the mountain ridge
8 flattening of the mountain ridge top 10 length axis of the mountain ridge
12 steep face of the mountain ridge
14 rocks
16 grass
18 sand
20 horizon
22 river
24 snow
26 snowfall
28 cloud
30 volcano
32 height of the volcano
34 length of the volcano hillslope
36 width of the volcano border
38 width of the volcano crater
40 crater lake
42 blending of water and lava
t time

The invention claimed is:

1. A method of visualizing one or more dimensions of data in a manufacturing execution system (MES), the method comprising:
   acquiring data from an industrial production process that is controlled by the manufacturing execution system (MES), wherein the data has a plurality of dimensions and each one of the dimensions stems from a respectively different one of a plurality of key performance indicators of the industrial production process;
   creating a virtual reality landscape as a three-dimensional virtual terrain by mapping the data onto a plurality of symbols, the symbols being comprised in a symbol library, each symbol having a plurality of physical dimensions representing the plurality of dimensions of the data;
   selecting the symbols in dependence on the value for the data, and at least one symbol of the plurality of symbols being a terrain shape metaphor in the virtual reality landscape, the at least one symbol having at least three physical dimensions, and three dimensions of the data are each respectively mapped on the at least three physical dimensions of said terrain shape;
   displaying the virtual reality landscape to a user for enabling the user to at least one of control and monitor the industrial production process; and
   enabling the mapping of the data and symbols to be changed by way of a user interface, wherein the user can interactively change or reshape the virtual reality landscape with the user interface independent of a change in the data.

2. The method according to claim 1, wherein the other symbols are selected from the group consisting of metaphors and idioms each representing one or more dimensions of the data.

3. The method according to claim 1, which comprises visualizing one or more dimensions of the data simultaneously.

4. The method according to claim 1, which comprises selecting the symbols from the group consisting of real world objects, natural phenomena, natural conditions and acoustic phenomena.

5. The method according to claim 1, wherein the virtual reality landscape itself is a symbol for the visualized data.

6. The method according to claim 1, which comprises placing one or more objects into the virtual reality landscape.

7. The method according to claim 1, which comprises combining one or more individual virtual reality landscapes.

8. The method according to claim 1, which comprises effecting the visualization dynamically.

* * * * *